UNITED STATES PATENT OFFICE.

HENRY WILLIAM DE STUCKLÉ, OF PARIS, FRANCE.

PROCESS OF PRODUCING PURE ZINC OXID.

1,118,894.  Specification of Letters Patent.  Patented Nov. 24, 1914.

No Drawing.  Application filed February 18, 1914.  Serial No. 819,355.

*To all whom it may concern:*

Be it known that I, HENRY WILLIAM DE STUCKLÉ, a citizen of the United States of America, residing at Paris, France, have invented certain new and useful Improvements in Processes of Producing Pure Zinc Oxid, of which the following is a specification.

This process relates to the manufacture of pure zinc oxid or pure metallic zinc, using zinc minerals, more particularly those minerals, the proportion of zinc in which is too low to be treated by metallurgical processes, or any salt of zinc as a raw material.

The present invention consists in lixiviating zinc from the minerals in the well-known manner by means of a suitable acid, such as sulfuric, hydrochloric, or nitric acid. The acid used is preferably mixed with a sufficient quantity of water in order to avoid crystallization of the zinc salt during lixiviation. The solutions obtained are deprived in the usual manner of foreign metals which are also partly dissolved by the acid. From the purified solutions zinc is precipitated in the form of zinc sulfite by a solution of ammonia sulfite. After the filtration and washing, the zinc sulfite is calcined. The residue of calcining is pure oxid of zinc which is suitable for all known purposes, that is to say, as a white pigment for painting and also as raw material for the manufacture of pure metallic zinc. The sulfur dioxid which escapes during the calcining, is used for regenerating the ammonia sulfite.

According to a known process, sulfite of zinc is prepared by causing a solution of an alkali sulfite to act on an equivalent quantity of a dissolved salt of zinc. Under these conditions, a portion of the zinc used is however not precipitated and remains dissolved in the mother lye. This circumstance is not an obstacle in the manufacture of sulfite of zinc in a laboratory, but in the manufacture of this product on a large scale, it is a great obstacle as the quantity of zinc which escapes precipitation, reduces the yield by 10-20%. In the process according to this invention, these losses are avoided, and practically the whole of the zinc is precipitated, caustic ammonia or carbonate of ammonia being added to the reaction mixture or to the ammonia sulfite used for the same, during or before the reaction. This action of ammonia could not have been expected, since as is known, most zinc precipitates are on the contrary dissolved by an excess of caustic ammonia or carbonate of ammonia. The caustic ammonia or the carbonate of ammonia can also be produced during or before the reaction by adding to the reaction mixture or to the ammonia sulfite used for the same, an alkali, such as hydrate of lime or carbonate of sodium, which by a double reaction with the ammonia sulfite, produces ammonia or carbonate of ammonia.

The sulfur dioxid produced during calcining of zinc sulfite, is utilized for producing ammonia sulfite, so that the latter is always regenerated, as already stated.

According to a known process, ammonia sulfite is produced by sulfur dioxid being absorbed in ammonia water. This process would not be suitable for the present invention, as sulfur dioxid which escapes during the calcining of zinc sulfite or of zinc blend, contains a certain quantity of air, and it has been found that: 1. during the absorption of sulfur dioxid in ammonia water in the presence of air, a large portion of the ammonia sulfite formed, is oxidized to ammonia sulfate, which results in a considerable loss of sulfur dioxid; 2. the air added, in passing through the ammonia water carries away a considerable quantity of ammonia, which results in a loss of ammonia. It has been further found that ammonia sulfite oxidizes considerably less in the presence of a free acid than in the presence of a free alkali, and that the losses just referred to, can be avoided by absorbing sulfur dioxid not in caustic ammonia, but in a solution of neutral or slightly acid ammonia sulfite. For that purpose, a slightly alkaline ammonia sulfite could also be used, as a slight alkalinity is quickly rendered harmless by the acid sulfur dioxid.

As at the ordinary temperature ammonia sulfite, as well as ammonia bisulfite in water solution, is not volatile, no ammonia can be carried away by the current of air, and moreover the ammonia sulfite at once becomes acid owing to the sulfur dioxid absorbed, so that the oxidation to sulfate in these conditions is only slight, as already stated. The sulfur dioxid dissolved in ammonia sulfite as a bisulfite, is subsequently neutralized with caustic ammonia, outside the absorbing apparatus, namely in a closed tank, in order to avoid oxidation by the air. The ammonia required for the purpose, is obtained from the ammonia salt produced during the precipitation of zinc sulfite by double reaction, in accordance with the following equation:

$$ZnSO_4 + (NH_4)2SO_3 = ZnSO_3 + (NH_4)2SO_4$$

To that end, the mother lyes containing the ammonia salt, are distilled in the known manner with lime, caustic ammonia being produced in accordance with the following equation:

$$(NH_4)2SO_4 + Ca(OH)2 = CaSO_4 + 2NH_4OH.$$

What I claim is:

1. A cyclical process of producing pure zinc oxid, which consists in reacting upon a dissolved zinc salt with ammonium sulfite in presence of caustic ammonia or ammonium carbonate, calcining the precipitated zinc sulfite and utilizing the evolved sulfur dioxid for regenerating the ammonium sulfite.

2. A cyclical process of producing pure zinc oxid, which consists in reacting upon a dissolved zinc salt with ammonium sulfite in presence of caustic ammonia or ammonium carbonate, calcining the precipitated zinc sulfite, introducing the evolved sulfur dioxid into a solution of ammonium sulfite, thereby producing ammonium bisulfite, and converting said ammonium bisulfite into mono-sulfite for use in a repetition of the cycle.

In testimony whereof I affix my signature in presence of two witnesses.

HENRY WILLIAM DE STUCKLÉ.

Witnesses:
LUCIEN DUCHESNE,
HANSON C. COXE.